US010391561B2

(12) United States Patent
Yano et al.

(10) Patent No.: US 10,391,561 B2
(45) Date of Patent: Aug. 27, 2019

(54) CUBIC BORON NITRIDE-BASED SINTERED MATERIAL AND CUTTING TOOL MADE OF CUBIC BORON NITRIDE-BASED SINTERED MATERIAL

(71) Applicant: MITSUBISHI MATERIALS CORPORATION, Tokyo (JP)

(72) Inventors: Masahiro Yano, Naka-gun (JP); Yosuke Miyashita, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 256 days.

(21) Appl. No.: 15/529,918

(22) PCT Filed: Nov. 27, 2015

(86) PCT No.: PCT/JP2015/083366
§ 371 (c)(1),
(2) Date: May 25, 2017

(87) PCT Pub. No.: WO2016/084929
PCT Pub. Date: Jun. 2, 2016

(65) Prior Publication Data
US 2017/0341155 A1 Nov. 30, 2017

(30) Foreign Application Priority Data

Nov. 27, 2014 (JP) .................................. 2014-240418
Nov. 25, 2015 (JP) .................................. 2015-229737

(51) Int. Cl.
*B23B 27/14* (2006.01)
*C04B 35/5831* (2006.01)
(Continued)

(52) U.S. Cl.
CPC ........ *B23B 27/148* (2013.01); *C04B 35/5831* (2013.01); *C04B 35/62836* (2013.01);
(Continued)

(58) Field of Classification Search
CPC ......................... C04B 35/5831; B23B 27/148
See application file for complete search history.

(56) References Cited

U.S. PATENT DOCUMENTS 6,008,153 A 12/1999 Kukino et al.
9,950,962 B2 * 4/2018 Kobayashi .............. C04B 41/87
(Continued)

FOREIGN PATENT DOCUMENTS

EP 2546010 A 1/2013
JP 56-009279 A 1/1981
(Continued)

OTHER PUBLICATIONS

International Search Report dated Jan. 26, 2016 for the corresponding PCT Application No. PCT/JP2015/083366.
Lv et al., "High pressure sintering of cubic boron nitride compacts with Al and AlN", Diamond and Related Materials, Dec. 1, 2008, pp. 2062-2066, vol. 17, No. 12, Elsevier Science Publishers, Amsterdam, NL.
European Search Report dated Jun. 11, 2018 for the corresponding European Patent Application No. 15864025.0.

*Primary Examiner* — Karl E Group
(74) *Attorney, Agent, or Firm* — Leason Ellis LLP

(57) ABSTRACT

A cubic boron nitride-based sintered material includes cubic boron nitride particles of 70 to 95 vol %, in which in a structure of a cross-section of the sintered material, a binder phase with a width of 1 nm to 30 nm is present between the adjacent cubic boron nitride particles, the binder phase being made of a compound containing at least Al, B, and N and having a ratio of an oxygen content to an Al content of 0.1 or less in terms of atomic ratio.

11 Claims, 9 Drawing Sheets

(51) Int. Cl.
*C04B 35/645* (2006.01)
*C04B 35/628* (2006.01)

(52) U.S. Cl.
CPC .. *C04B 35/62884* (2013.01); *C04B 35/62897* (2013.01); *C04B 35/645* (2013.01); *B23B 2226/125* (2013.01); *C04B 2235/3217* (2013.01); *C04B 2235/3232* (2013.01); *C04B 2235/3258* (2013.01); *C04B 2235/386* (2013.01); *C04B 2235/3813* (2013.01); *C04B 2235/3843* (2013.01); *C04B 2235/3847* (2013.01); *C04B 2235/3856* (2013.01); *C04B 2235/3865* (2013.01); *C04B 2235/3886* (2013.01); *C04B 2235/402* (2013.01); *C04B 2235/404* (2013.01); *C04B 2235/5436* (2013.01); *C04B 2235/5445* (2013.01); *C04B 2235/604* (2013.01); *C04B 2235/6567* (2013.01); *C04B 2235/6581* (2013.01); *C04B 2235/661* (2013.01); *C04B 2235/723* (2013.01); *C04B 2235/80* (2013.01)

(56) References Cited

U.S. PATENT DOCUMENTS 10,081,577 B2 *  9/2018  Hirano ............... B23B 27/14
2009/0169840 A1   7/2009  Okamura et al.
2013/0260165 A1  10/2013  Kobayashi et al.

FOREIGN PATENT DOCUMENTS

| JP | 02-236253 A | 9/1990 |
| JP | 06-001666 A | 1/1994 |
| JP | 06-016476 A | 1/1994 |
| JP | 08-197307 A | 8/1996 |
| JP | 10-218666 A | 8/1998 |
| JP | 2004-026555 A | 1/2004 |
| JP | 2011-212832 A | 10/2011 |
| JP | 5032318 B | 9/2012 |
| WO | WO-2007/145071 A | 12/2007 |

* cited by examiner

CUBIC BORON NITRIDE-BASED SINTERED MATERIAL AND CUTTING TOOL MADE OF CUBIC BORON NITRIDE-BASED SINTERED MATERIAL

CROSS-REFERENCE TO RELATED PATENT APPLICATIONS

This application is a U.S. National Phase Application under 35 U.S.C. § 371 of International Patent Application No. PCT/JP2015/083366 filed on Nov. 27, 2015 and claims the benefit of Japanese Patent Applications No. 2014-240418, filed on Nov. 27, 2014, and No. 2015-229737, filed on Nov. 25, 2015, all of which are incorporated herein by reference in their entirety. The International Application was published in Japanese on Jun. 2, 2016 as International Publication No. WO/2016/084929 under PCT Article 21(2).

FIELD OF THE INVENTION

The present invention relates to a cubic boron nitride (hereinafter, referred to as "cBN" in some cases)-based sintered material (hereinafter, referred to as "cBN sintered material" in some cases) having high hardness.

BACKGROUND OF THE INVENTION

From the viewpoint that a cBN sintered material has high hardness and high thermal conductivity second only to diamond and further has low affinity with iron based material, the cBN sintered material is preferably used as a cutting tool of an iron based work material such as steel or cast iron, conventionally.

In order to improve the performance as a cutting tool, several proposals have been made to further improve the strength, toughness, hardness, and the like of the cBN sintered material.

For example, in Japanese Unexamined Patent Application, First Publication No. H8-197307, in preparing the cBN sintered material by ultra-high pressure sintering, it is proposed to improve the strength and toughness of the cBN sintered material by making the binder phase into a skeleton structure and making a structure in which cBN particles as hard particles, and a reaction product formed of: a boride and a nitride of Al; and a boride of Ti are dispersed in the binder phase structure.

In addition, in Japanese Patent Publication No. 5032318, in the cBN sintered material, in order to remove oxygen adsorbed on the surface of cBN particles when cBN particles are bound, it is proposed to achieve compatibility between improvement in heat resistance and improvement in toughness of the cBN sintered material by using Ti or Al as a raw material to act as a getter of oxygen to prevent alteration of the cBN particles themselves caused by the solid solution of oxygen into the cBN particles, and to form a structure having a continuous structure in which the cBN particles are bound to each other and in which the binder phases are bound to each other.

Technical Problem

As described in Japanese Unexamined Patent Application, First Publication No. H8-197307 and Japanese Patent Publication No. 5032318, although proposals for improving the properties of a cBN sintered material have been made, the proposals cannot be said to be sufficient yet.

For example, the cBN sintered material for a cutting tool shown in Japanese Unexamined Patent Application, First Publication No. H8-197307 has a binder phase as a skeleton structure and a structure in which cBN particles as hard particles, and a reaction product formed of: a boride and a nitride of Al; and a boride of Ti are dispersed in the binder phase structure. In a case where the cBN sintered material having such a structure is used as the cutting tool, if the cBN content in the sintered material is increased in order to apply the cBN sintered material to cutting conditions with a high load on an edge tip, the cBN particles are brought into contact with each other and the unsintered portion which cannot react sufficiently with the binder phase increases. Since this unsintered portion is weaker in strength than the portion where the cBN particles and the binder phase are in contact with each other, there is a problem that the hardness corresponding to the cBN content cannot be obtained as the cBN content increases. In addition, in a case where such a cBN sintered material having insufficient hardness is used as a tool, cracks are likely to be generated starting from the portion where the cBN particles are in contact with each other. Therefore, if such a tool is used for intermittent cutting with high load on the edge tip, there is a problem that the edge tip is likely to be chipped and the tool life is short.

In addition, in the cBN sintered material disclosed in Japanese Patent Publication No. 5032318, although the influence of oxygen on the cBN particles themselves can be prevented, since oxides of Ti or the like having relatively weak strength remain at the interface between the cBN particles and the cBN particles in the binder phase structure, there is a problem that the cBN sintered material having low hardness can be obtained as a whole.

SUMMARY OF THE INVENTION

Solution to Problem

In order to solve the above problems, the present inventors focused attention on the binder present between the cBN particles and the cBN particles and made intensive studies to improve the hardness of the cBN sintered material. As a result, the following findings are obtained.

The conventional cBN sintered material is prepared by mixing cBN powders serving as a constituent component of the cBN sintered material with TiN powders, $TiAl_3$ powders, $Al_2O_3$ powders and the like serving as a binder phase forming component, and sintering them under ultra-high pressure and high temperature conditions.

The present inventors have found the following. That is, in preparing the cBN sintered material, in order to use the cBN particles having high surface cleanliness obtained by pretreating the surface of cBN particles as raw materials, for example, an AlN film having an extremely thin thickness is formed on the surface of the cBN particle by the atomic layer deposition (ALD, this method is a type of CVD method in which molecules of a raw material compound are caused to react on a base in a vacuum chamber for each layer and purging with Ar or nitrogen is repeatedly performed to form a film.) method or the like. Thereafter, the AlN film is heated under vacuum, and then pretreatment including the process of peeling the AlN film by ball mill mixing is performed.

Such pretreatment is applied to the cBN particles, and thus the cBN particles with high surface cleanliness, from which impurity components such as oxygen adhered and adsorbed on the surface of the cBN particles are removed, are obtained.

Using these cBN particles as the raw materials and sintering under ultra-high pressure conditions together with the binder phase forming component, the cBN sintered material is prepared. As a result, the oxygen content (herein, the value of the atomic ratio of the oxygen content to the Al content) in the binder phase present between the cBN particles and the cBN particles becomes a small value, so that the oxide in the binder phase between the cBN particles and the cBN particles can be reduced, a strong binder phase can be formed, and the unsintered portions where the cBN particles come into contact with each other and cannot sufficiently react with the binder phase are reduced.

As a result, in the cBN sintered material of the present invention, the present inventors found that the cBN sintered material having high hardness can be obtained even in a case where the content ratio of the cBN contained in the sintered material is increased.

The present invention has been made based on the above findings, as follows:

"(1) A cubic boron nitride-based sintered material including: cubic boron nitride particles of 70 to 95 vol %, in which in a structure of a cross-section of the sintered material, a binder phase with a width of 1 nm to 30 nm is present between the adjacent cubic boron nitride particles, the binder phase being made of a compound containing at least Al, B, and N and having a ratio of an oxygen content to an Al content of 0.1 or less in terms of atomic ratio.

(2) A cubic boron nitride-based sintered material including: cubic boron nitride particles of 70 to 95 vol %, in which in a structure of a cross-section of the sintered material, there is a region where an interval between the adjacent cubic boron nitride particles is 30 nm or less, where a binder phase is made of a nitride containing at least one of Al and B, or both Al and B, and an Al oxide, and where a ratio of an oxygen content to an Al content in the binder phase is 0.1 or less in terms of atomic ratio.

(3) The cubic boron nitride-based sintered material according to the above (1) or (2), in which the average particle diameter of the cubic boron nitride particles is 0.5 to 8.0 μm, in at least five fields of view of the structure of the cross-section of the cubic boron nitride-based sintered material with a field of view of 5 times×5 times the average particle diameter of the cubic boron nitride particles as one field of view, the cubic boron nitride particles having a binder phase with a width of 1 nm to 30 nm between the adjacent cubic boron nitride particle are observed in fields of view of 60% or more of the total number of the fields of view, the binder phase having a ratio of an oxygen content to an Al content of 0.1 or less.

(4) The cubic boron nitride-based sintered material according to any one of the above (1) to (3), in which in the structure of the cross-section of the cubic boron nitride-based sintered material: an average particle number ratio of the number of the cubic boron nitride particles having the binder phase with a width of 1 nm to 30 nm between the adjacent cubic boron nitride particle with respect to the total number of the cubic boron nitride particles in the observed cross-section is 0.4 or more; and among the cubic boron nitride particles having the binder phase with a width of 1 nm to 30 nm between the adjacent cubic boron nitride particle, an average ratio of the number of the cubic boron nitride particles having the binder phase with a ratio of an oxygen content to an Al content of 0.1 or less with respect to the number of the cubic boron nitride particles having the binder phase with a width of 1 nm to 30 nm between the adjacent cubic boron nitride particle is 0.5 or more.

(5) The cubic boron nitride-based sintered material according to any one of the above (1) to (4), in which the binder phases which are present between the adjacent cubic boron nitride particles and have a width of 1 nm to 30 nm are dotted between the adjacent cubic boron nitride particles.

(6) A cutting tool made of cubic boron nitride-based sintered material including: a cutting edge portion made of the cubic boron nitride-based sintered material according to any one of the above (1) to (5)."

Advantageous Effects of Invention

The cBN sintered material of the present invention contains 70 to 95 vol % of the cBN particles having an average particle diameter of preferably 0.5 μm to 8.0 μm. In addition to this, in a structure of a cross-section of the sintered material, the binder phases with the width of 1 nm to 30 nm are present between the adjacent cBN particles, the binder phases are made of a compound containing at least Al, B, and N, and a ratio of an oxygen content to an Al content in the binder phase is 0.1 or less. Therefore, the amount of oxides in the binder phase between the cBN particles and the cBN particles is small, the binder phase is strong, and the amount of the unsintered portions where the cBN particles come into contact with each other and cannot sufficiently react with the binder phase is small. As a result, the sintered material exhibits high hardness even when the content ratio of the cBN particles is large.

In addition, the cutting tool using the cBN sintered material of the present invention exhibits excellent fracturing resistance, and can extend the tool life.

DETAILED DESCRIPTION OF THE INVENTION

Figure 1:
FIG. 1 shows a high angle scattering annular dark field (HAADF) image (80000 times) by a scanning transmission electron microscope (STEM) of an interface between cBN particles of a cBN sintered material (hereinafter, referred to as "invention cBN sintered material" in some cases) according to an embodiment of the present invention.
Figure 2:
FIG. 2 shows a binary image (80000 times) of a B mapping image by STEM of the interface between the cBN particles of the invention cBN sintered material.
Figure 3:
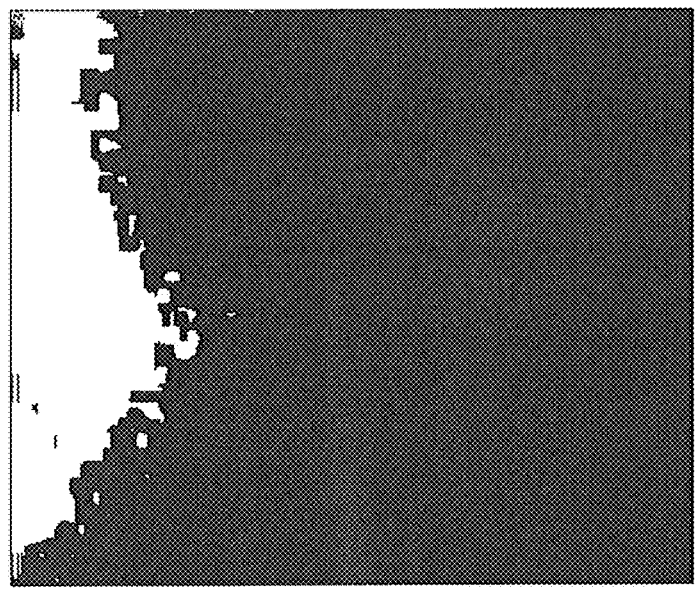
FIG. 3 shows a binary image (80000 times) of an N mapping image by STEM of the interface between the cBN particles of the invention cBN sintered material.
Figure 4:
FIG. 4 shows a binary image (80000 times) of an Al mapping image by STEM of the interface between the cBN particles of the invention cBN sintered material.

An embodiment of the present invention (hereinafter, referred to as "the present embodiment") will be described below. A cBN sintered material according to the present embodiment includes: cBN particles having a volume fraction of 70 to 95 vol % with respect to the volume of the whole cBN sintered material; and a binder phase that binds each cBN particle to each other. In addition, in a structure of a cross-section of the sintered material, a binder phases with the width of 1 nm to 30 nm is present between the adjacent cBN particles. Furthermore, this binder phase contains at least aluminum (Al), boron (B), and nitrogen (N), and has a ratio of the O content to an Al content of 0.1 or less (in terms of an atomic ratio calculated from the area ratio on the above cross section). As the above-described binder phase with the width of 1 nm to 30 nm present between the adjacent cBN particles, the binder phases may be dotted between the adjacent cBN particles, and one binder phase may extend between the cBN particles (that is, cBN particles may be adjacent to other cBN particles via one of the above binder phases).

<Production Method>

In the production of the cBN sintered material of the present embodiment, cBN particles pretreated on the surface thereof are used as the cBN raw material. Specifically, the cBN sintered material of the present embodiment is produced by a step of performing a pretreatment on the surface of the cBN particles, a step of mixing the pretreated cBN particles with raw material powders constituting the binder phase and molding them, and a step of sintering the molded material.

The pretreatment of the surface of the cBN particles is carried out, for example, as follows.

First, for example, an AlN film is formed on the surface of the cBN particles by the ALD method. For film formation, the cBN particles are charged into a fluidized bed furnace, the inside of the furnace is heated to about 350° C., and the cycle is repeated until the desired AlN film thickness is obtained, with an Ar+Al $(CH_3)_3$ gas inflow step, an Ar gas purge step, an Ar+$NH_3$ gas inflow step, and an Ar gas purge step as one cycle. For example, by forming a film over 30 minutes, an AlN film with a film thickness of approximately 5 nm can be coated on the surface of the cBN particles.

Subsequently, the cBN particles having the AlN film with the predetermined thickness formed on the surface thereof are heated at approximately 1000° C. under vacuum to diffuse impurity elements such as oxygen on the surface of the cBN into the AlN film, and to trap the impurity elements in the AlN film.

Subsequently, the AlN film in which the impurity elements are trapped is peeled off from the surface of the cBN by ball mill mixing.

By subjecting the cBN particles to such pretreatment, the cBN particles with high surface cleanliness, from which the impurity elements such as oxygen adsorbed on the surface of the cBN are removed, are obtained. The pretreatment of the surface of the cBN particles is not limited to the above-described ALD method, and any method capable of removing the impurity components on the surface of the cBN particles may be used.

Then, the pretreated cBN particles are used as a raw material, and further, for example, TiN powders, Al powders, $TiAl_3$ powders, and $Al_2O_3$ powders are used as raw material powders. These raw material powders are blended to have a predetermined composition to prepare a molded material of a predetermined size.

Subsequently, the molded material is charged into a conventional ultra-high pressure sintering apparatus, and sintered at an ultra-high pressure and a high temperature for a predetermined time under sintering conditions of, for example, a pressure of 5 GPa or more and a temperature of 1600° C. or more, and thus a cBN sintered material of the present embodiment can be prepared. In this manner, the cBN sintered material is prepared by using the cBN particles from which the impurity elements on the surface thereof are removed by the pretreatment, and thereby the cBN sintered material according to the present embodiment can be obtained.

In a case where the cBN sintered material of the present embodiment is used as a cutting tool material, for example, in a state in which the molded material is disposed on a support piece made of tungsten carbide (WC)-based cemented carbide, the molded material is charged into a conventional ultra-high pressure sintering apparatus and sintered at ultra-high pressure and high temperature under the same conditions as described above. Thereby, it is possible to prepare a cutting tool having WC-based cemented carbide as a backing material and having the cBN sintered material of the present embodiment as a cutting edge portion.

<Content Ratio of cBN Particles in cBN Sintered Material>

In the cBN sintered material prepared by the above method, in a case where the content ration of the cBN particles in the cBN sintered material is less than 70 vol %, although the unsintered portions where the cBN particles come into contact with each other and cannot sufficiently react with the binder phase are reduced, the portions where the binder phases with the width of 1 nm to 30 nm are present between the cBN particles are extremely reduced, the binder phase component (for example, compound of Ti and Ta, boride of Al) other than a compound containing at least Al, B, and N is increased between the cBN particles, and a structure exhibiting the effect of the present embodiment cannot be formed. That is, the Ti compound and Al boride have lower adhesion strength to the cBN particles compared to the binder phase containing at least Al, B, and N. Therefore, in a case of being used as a cutting tool, the interface between the cBN particles of the Ti compound and the Al boride is likely to be the starting point of cracks, and as a result, the fracturing resistance decreases. Therefore, it is not preferable that the content ratio of the cBN particles in the cBN sintered material is less than 70 vol %. On the other hand, in a case where the content ratio of the cBN particles exceeds 95 vol % and in a case of being used as the cutting tool, voids as starting points of cracks are likely to be generated in the sintered material, and the fracturing resistance decreases. Therefore, the content ratio of the cBN particles in the cBN sintered material is set to 70 to 95 vol %. The content ratio of the cBN particles in the cBN sintered material is preferably 70 to 90 vol %, more preferably 75 to 85 vol %, but is not limited thereto.

<Content Ratio of cBN Particles in cBN Sintered Material>

In addition, for the content ratio of the cBN particles in the cBN sintered material, the structure of the cross-section of the cBN sintered material is observed by SEM, and a portion corresponding to the cBN particles in the obtained secondary electron image is extracted by the same image processing as described above. The area occupied by the cBN particles is calculated by an image analysis, and the ratio occupied by the cBN particles in one image is obtained. The average value of the content ratios of the cBN particles obtained by processing at least three images is obtained as the content ratio of the cBN particles in the cBN sintered material. It is desirable to use a square region with a side having a length of five times the average particle diameter of the cBN particles as the observation region used for image processing. For example, in a case of the cBN particles having an average particle diameter of 3 μm, a field of view region of approximately 15 μm×15 μm is desirable.

<Average Particle Diameter of cBN Particles>

In addition, the average particle diameter of the cBN particles used in the present embodiment is not particularly limited, but it is preferably in the range of 0.5 to 8 μm.

This is due to the following reason.

In a case where the cBN sintered material is used as a cutting edge portion of the cutting tool, the cBN particles having an average particle diameter of 0.5 μm to 8 μm are dispersed in the sintered material. Therefore, it is possible to suppress chipping starting from the concave-convex shape of the edge tip caused by falling off of the cBN particles on the tool surface during use of the tool. In addition, by the cBN particles dispersed in the sintered material, it is possible to suppress propagation of cracks proceeding from the interface between the cBN particles and the binder phase or cracks proceeding through the cBN particles, which are caused by stress applied to the edge tip during use of the tool. Therefore, such a cutting tool has excellent fracturing resistance.

Accordingly, the average particle diameter of the cBN particles used in the present embodiment is preferably in the range of 0.5 to 8 μm, and more preferably in the range of 0.5 to 3 μm.

Here, the average particle diameter of the cBN particles can be obtained as follows.

The structure of the cross-section of the cBN sintered material is observed by SEM to obtain a secondary electron image. For example, in a case where the average particle diameter of the cBN particles is 3 μm, a secondary electron image with 15 μm×15 μm (5 times square of average particle diameter of cBN particles) is obtained. A portion corresponding to the cBN particles in the obtained image is extracted by image processing and the maximum length of a portion corresponding to each particle extracted by image analysis is obtained by the following procedure. First, in extracting a portion corresponding to the cBN particles by the image processing, in order to clearly determine the cBN particles and the binder phase, the image is displayed in monochrome (256 gradations with 0 as black and 255 as white), and binarization processing is performed using the image of the pixel value at which the ratio of the pixel value of the binder phase portion to the pixel value of the cBN particle portion is 2 or more so that the cBN particle becomes black.

The pixel values of the cBN particle portion and the binder phase portion are obtained from the average value within the region of approximately 0.5 μm×0.5 μm. It is desirable to obtain average values of pixel values in at least three different regions in the same image and to use the average value thereof as each contrast.

After the binarization processing, processing is performed to separate the portions where the cBN particles are considered to be in contact with each other. For example, watershed as one of image processing operations is used to separate the cBN particles which are thought to be in contact with each other.

The portion corresponding to the cBN particles (black portion) in the image obtained after the above processing is analyzed by particle analysis and the maximum length of the portion corresponding to each particle is obtained. The obtained maximum length is set as the maximum length of each particle, and it is set as the diameter of each particle. From this diameter, the volume of each particle is calculated assuming that each particle is a sphere. The cumulative distribution of the particle diameter is obtained based on the obtained volume of each particle. Specifically, for each particle, the sum of the volume thereof and the volume of particles having a diameter equal to or less than its particle diameter is obtained as a cumulative value. For each particle, a graph is drawn with the volume percent [%] which is the ratio of the above cumulative value of each particle to the sum of the volumes of all the particles as the vertical axis, and the diameter [μm] of each particle as the horizontal axis. The value of the diameter (median diameter) at which the volume percentage is 50% is set as the average particle diameter of the cBN particles in one image. The average value of the average particle diameter values obtained by performing the above processing on at least three images is set as the average particle diameter [μm] of the cBN particles of the cBN sintered material. When the particle analysis is performed, the length (μm) per pixel is set using the scale value known in advance by SEM. In addition, in the particle analysis, in order to remove noise, a region smaller than 0.02 μm in diameter is not calculated as particles.

<Identification of Binder Phase with Width of 1 nm to 30 nm Between Adjacent cBN Particles, Component Analysis of Binder Phase, and Measurement of O/Al>

Identification of the binder phase with the width of 1 nm to 30 nm between the adjacent cBN particles and component analysis of the binder phase can be performed as follows.

After preparing the cBN sintered material, the cross section of the sintered material is polished. Thereafter, the interface where the cBN particles and the cBN particles are adjacent to each other is observed using STEM (refer to FIG. 1). FIG. 1 is a high angle scattering annular dark field (HAADF) image (80000 times) obtained by observing the interface between the cBN particles and the cBN particles using a scanning transmission electron microscope (STEM). The thickness of the observation sample is preferably 3 nm to 70 nm. If the thickness is thinner than 3 nm, it is not preferable because the amount of characteristic X-rays to be detected is small at the time of element mapping, it takes time to measure, and the sample is easily damaged. On the other hand, if the thickness is greater than 70 nm, it is not preferable because analysis of the image becomes difficult. The observation image has an image size of approximately 500 nm in length×500 nm in width to 150 nm in length×150 nm in width, and a resolution of 512×512 pixels or more. Mapping images of boron (B), nitrogen (N), aluminum (Al), and oxygen (O) elements (refer to FIGS. 2 to 4, 11 and 12) are obtained at the observation point. These images represent images converted to atm % with these four elements for the purpose of removing the background (images converted into the ratio (atm %) of the amount of each element to the total content of the four elements). Based on these images, by the following procedure, whether or not there are dotted or interposed binder phases with a width of 1 nm to 30 nm between the adjacent cBN particles is determined, and the ratio occupied by Al and O between the cBN particles in the binder phase is obtained.

(a) From the mapping image of B and N (refer to FIGS. 2 and 3), it is checked that the observed region is the location where the cBN particles are to be observed (region where a plurality of cBN particles are present).

(b) The mapping image of Al (refer to FIG. 4), the mapping image of B (FIG. 2) of the above (a), and the mapping image of N (FIG. 3) of the above (a) are superimposed, and thus the position of the binder phase that is present between the cBN particles and contains at least Al, B, and N is identified. The width of the binder phase is determined as follows.

(b1) In a case where the binder phase is interposed between the cBN particles, that is, in a case where there is one Al island which overlaps with the region where B and N are present (in a case where one binder phase extends between the cBN particles), first, in the mapping image of Al, the longitudinal axis is obtained when Al island corresponding to the binder phase is approximated as ellipse. Specifically, the Al island overlapping with the region where B and N are present is extracted by the image processing in the same manner as the processing performed in the above measurement of the average particle diameter of the cBN particles, and the maximum length in a case where the island extracted by image analysis is approximated to the ellipse is set as a longitudinal axis. The longitudinal axis is set as the interface boundary line between the cBN particles.

Figure 5:
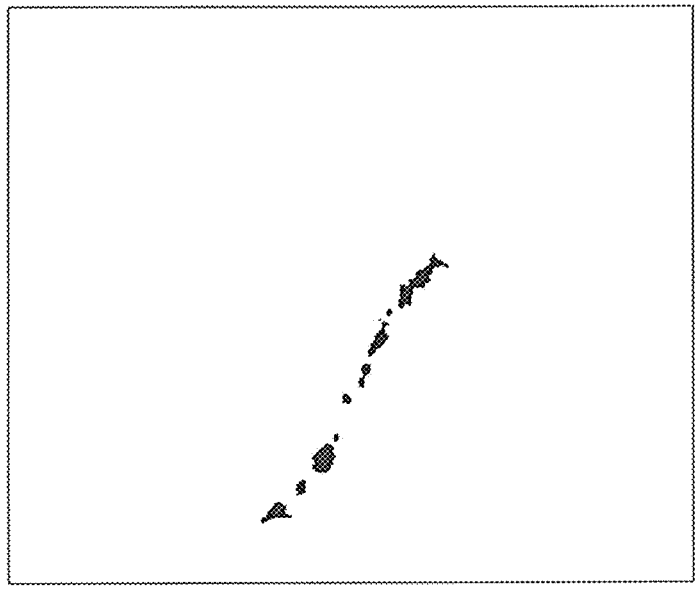
FIG. 5 is a view showing regions where B, N, and Al overlap in FIGS. 2 to 4.
Figure 6:
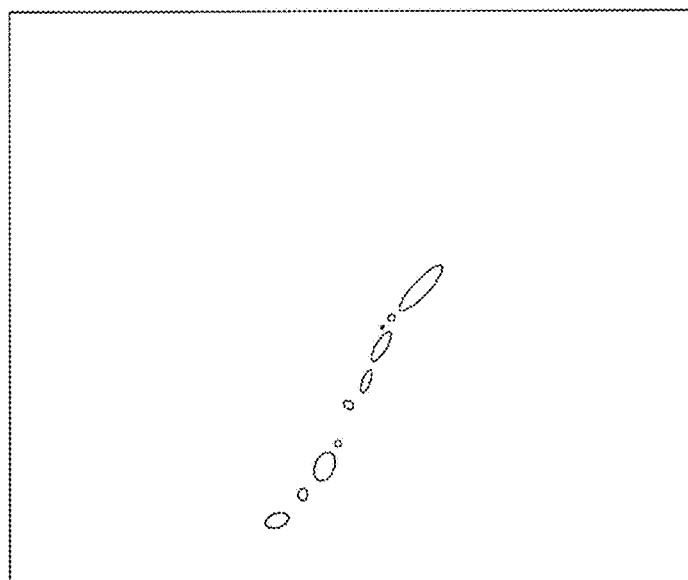
FIG. 6 is a view showing a state in which a region (island) where B, N, and Al overlap in FIG. 5 is elliptically approximated by image processing.
Figure 7:
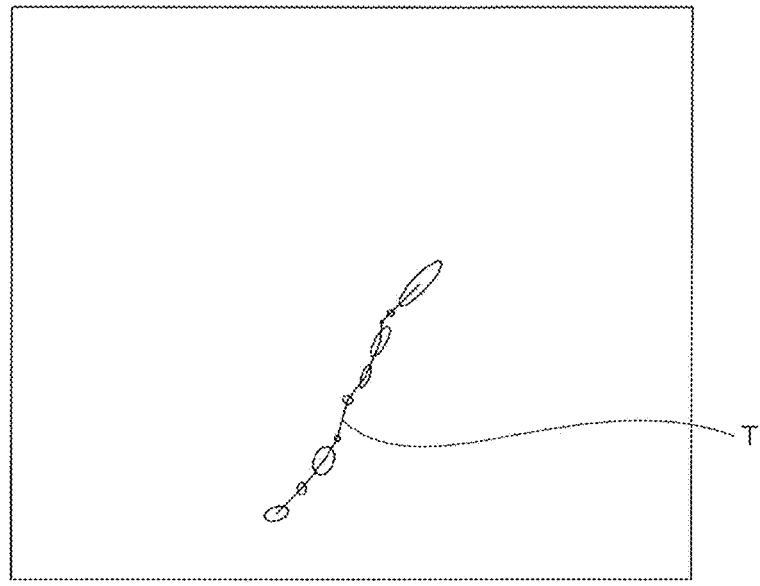
FIG. 7 is a view in which an interface boundary line including a polygonal line connecting a midpoint of a minor axis of each ellipse with a straight line is drawn in FIG. 6.
Figure 8:
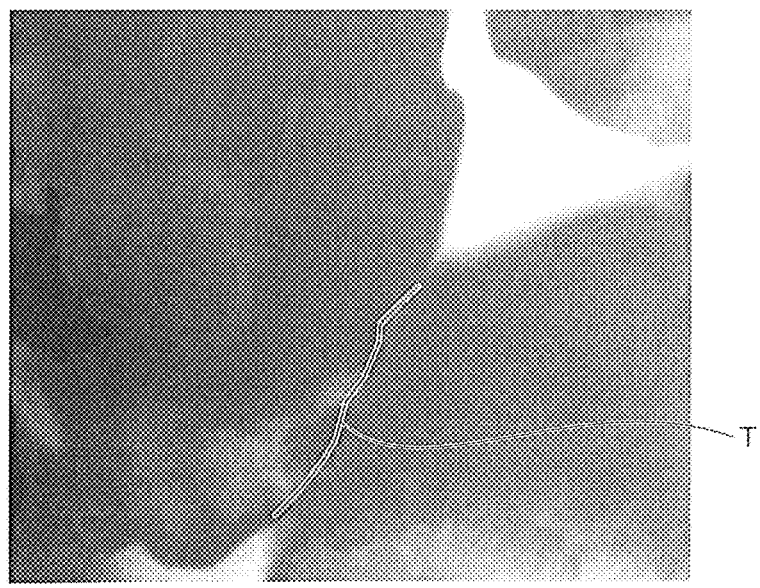
FIG. 8 shows an interface boundary line between the cBN particles obtained from an Al mapping image, a B mapping image, and an N mapping image of interfaces between the cBN particles of the invention cBN sintered material.

(b2) In addition, in a case where the binder phases are dotted at the interface between the cBN particles, that is, in a case where two or more Al islands overlapping with the region where B and N are present are divided, each island of Al overlapping with the region where B and N are present is extracted by the image processing (FIG. 5) in the same manner as the processing performed in the measurement of the average particle diameter of the above cBN particles, and each island obtained by the image analysis is approximated to the ellipse (FIG. 6). The minor axis of each ellipse is obtained. The midpoint in each minor axis is obtained and a polygonal line T connecting each of the adjacent midpoints with a straight line is draw, and thus the interface boundary line between the cBN particles is obtained (FIGS. 7 and 8).

Figure 9:
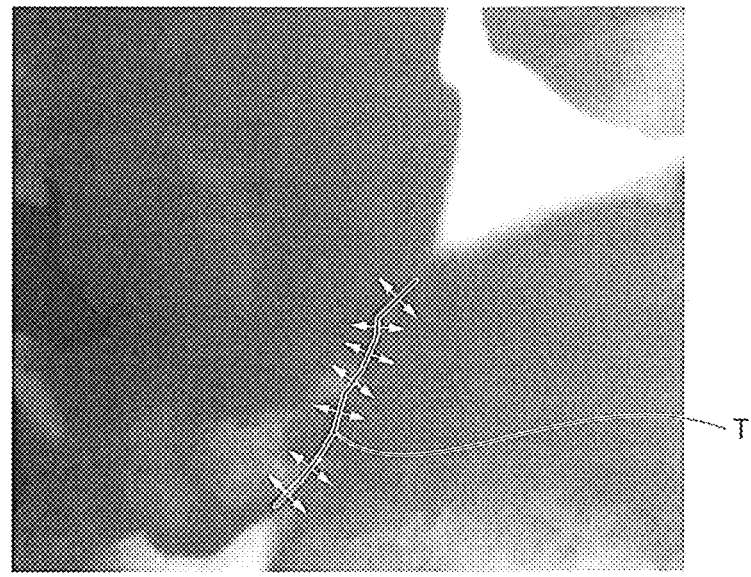
FIG. 9 shows a direction perpendicular to the interface boundary line (direction of arrow in FIG. 9).
Figure 10:
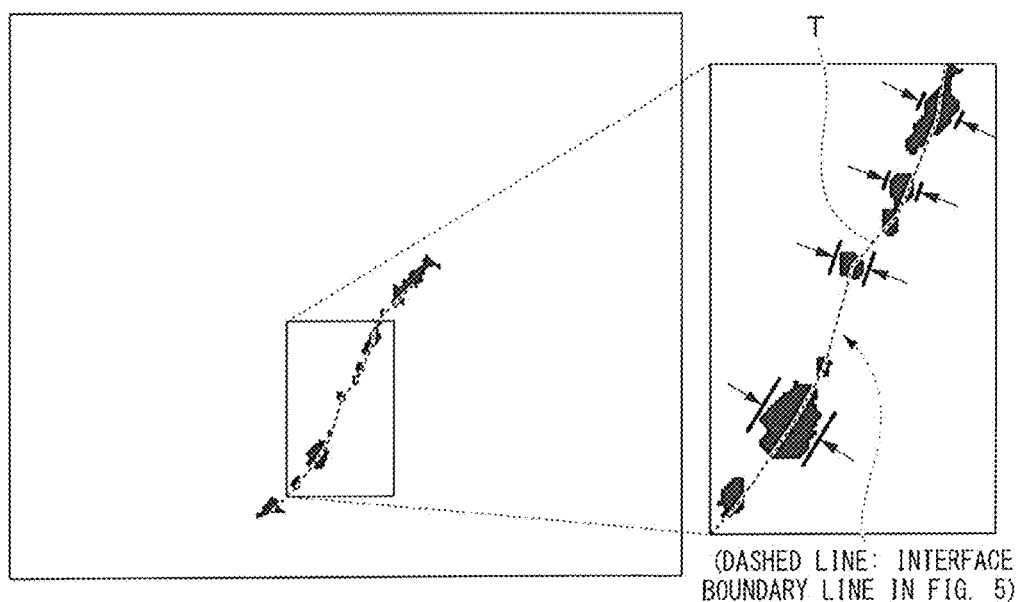
FIG. 10 shows a width of a binder phase between the cBN particles obtained from FIG. 5 and the interface boundary line, and a partial enlarged view thereof.

(b3) In the Al island (FIG. 10) of the Al mapping image overlapping with the interface boundary line obtained in the above (b1) or (b2), the width of the Al island in the direction perpendicular to the interface boundary line (FIG. 9) is measured (refer to FIG. 10), and the average value of the width measured at least three places or more is set as the width of the binder phase present between the cBN particles.

In a case where the width is 1 nm to 30 nm, the width of the binder phase present between the cBN particles is assumed to be 1 nm to 30 nm.

In the cBN sintered material, in a case where the binder phase containing Al, B, and N and with the width of 1 to 30 nm is not present between the adjacent cBN particles, the strength sufficient to adhere between the cBN particle and the cBN particle cannot be obtained or destruction starting from the interior of the binder is likely to be generated. It is not preferable because as a result, the sintered material having low hardness is obtained.

Figure 11:
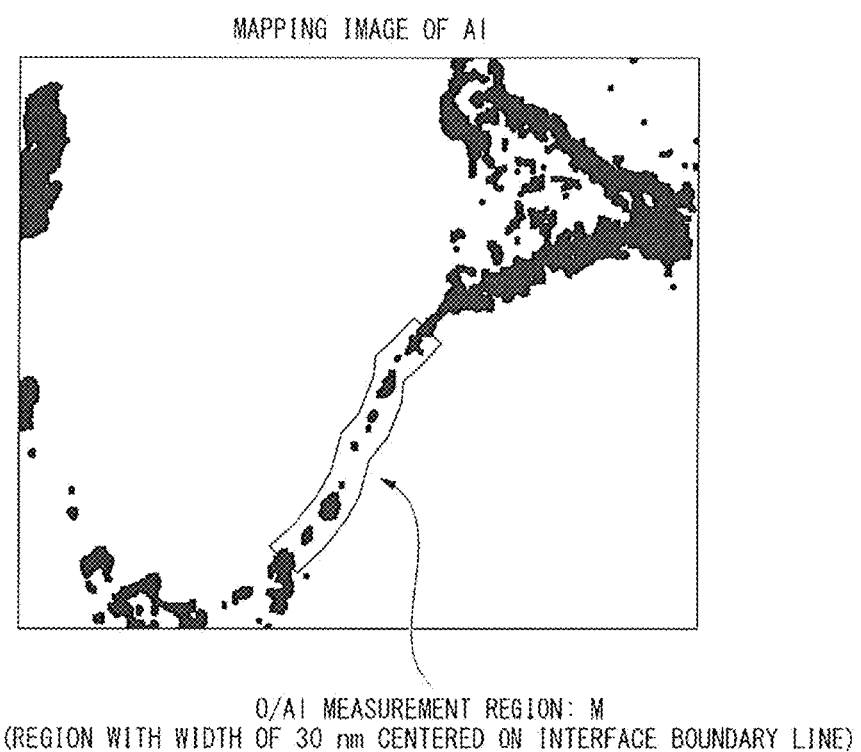
FIG. 11 shows the binary image of the Al mapping image (80000 times) by STEM of the interface between the cBN particles of the invention cBN sintered material, and a measurement region with width of 30 nm centered on the interface boundary line.
Figure 12:
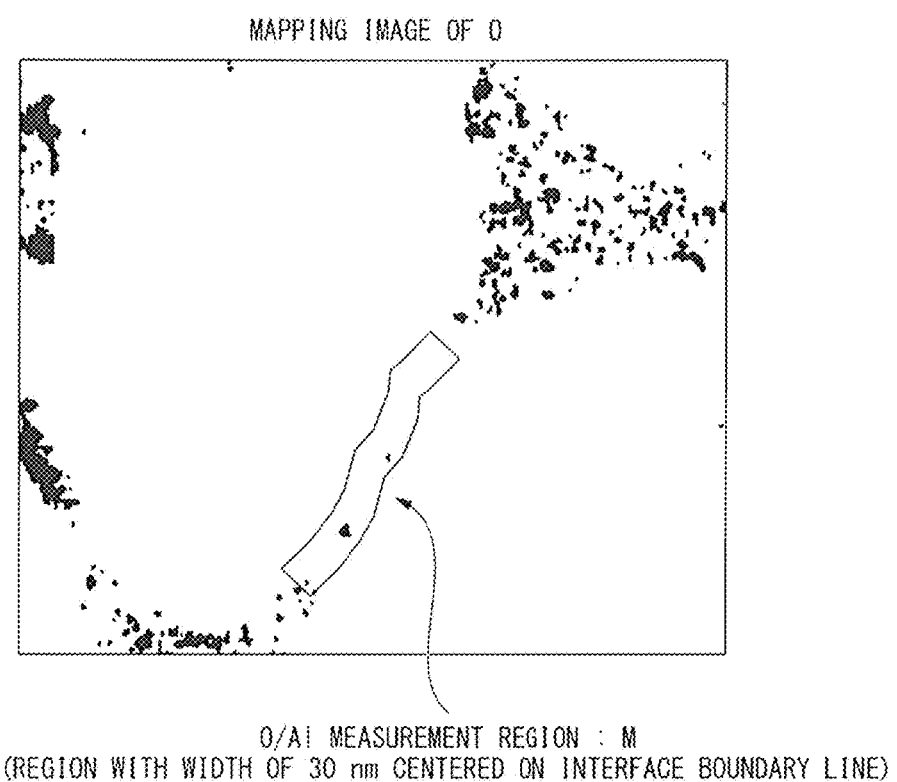
FIG. 12 shows the binary image of an O (oxygen) mapping image (80000 times) by STEM of the interface between the cBN particles of the invention cBN sintered material, and a measurement region with width of 30 nm centered on the interface boundary line.

(c) Next, the amounts of Al and O contained in the binder phase are determined as follows. First, a measurement region M with the width of 30 nm centered on the interface boundary line confirmed in the above (b) is determined using an image obtained by binarization processing of the mapping image of Al and O (FIGS. 11 and 12). This region M represents a region surrounded by two lines parallel and congruent to the interface boundary line with a distance of 15 nm from the interface boundary line at both sides of the interface boundary line, and two straight lines connecting the end portions of the two lines. The amount (area %) of Al and O in a portion where B, N, and Al overlap in this region M is obtained. Specifically, the area of Al in the portion where B, N, and Al present in this area M overlap is obtained from the image obtained by the binarization processing of the mapping image of Al, and the ratio of the area of Al to the area of this region is set as the amount of Al contained in the binder phase. In addition, similarly for 0, the ratio of the area of O to the area of the above region M is obtained, and this is set as the amount of 0 contained in the binder phase. The ratio (area %) of the area of Al and O contained in the binder phase obtained in this manner is set as the amount (atomic ratio) of Al and O, respectively.

(d) From the amounts (area %) of Al and O obtained above, the ratio of the oxygen content to the Al content in the binder phase (hereinafter, referred to as "O/Al" in some cases) is calculated.

According to the procedures (a) to (d) described above, the component analysis of the binder phases with the width of 1 nm to 30 nm and present in the region with the width of 30 nm centered on the interface boundary line defined between the adjacent cBN particles can be performed and the value of O/Al in the binder phase can be determined.

The binder phases present to be dotted or interspersed at the interface between the adjacent cBN particles and with the width of 1 nm to 30 nm are made of the component containing at least Al, B, and N (refer to FIGS. 2 to 12).

According to the above procedures (a) to (d), it is determined whether or not there are the binder phases with a width of 1 nm to 30 nm between the adjacent cBN particles. In a case where such a binder phase is present, the component analysis in the binder phase can be performed and the value of O/Al in the binder phase can be obtained.

"Dotted" represents a state in which Al is present as a plurality of island shapes in a portion where Al, B, and N overlap, and "interposed" represents a state in which Al is present in a continuous manner in a portion where Al, B, and N overlap.

The binder phases present between the adjacent cBN particles and with the width of 1 nm to 30 nm contain at least Al, B, and N. In the present embodiment, the main structure of the binder phase is made of Al, B, and N (refer to FIGS. 2 to 12).

<Presence Ratio of cBN Particles Having Binder Phase with Width of 1 nm to 30 Nm Between Adjacent cBN Particles>

The presence ratio of the cBN particles in which the binder phase with the width of 1 nm to 30 nm are present between the adjacent cBN particles is measured. In other words, the presence ratio (q/Q) of the cBN particles having the binder phase with the width of 1 nm to 30 nm between the adjacent cBN particles to total cBN particles is measured. This measurement can be performed specifically as follows, for example.

Figure 13:
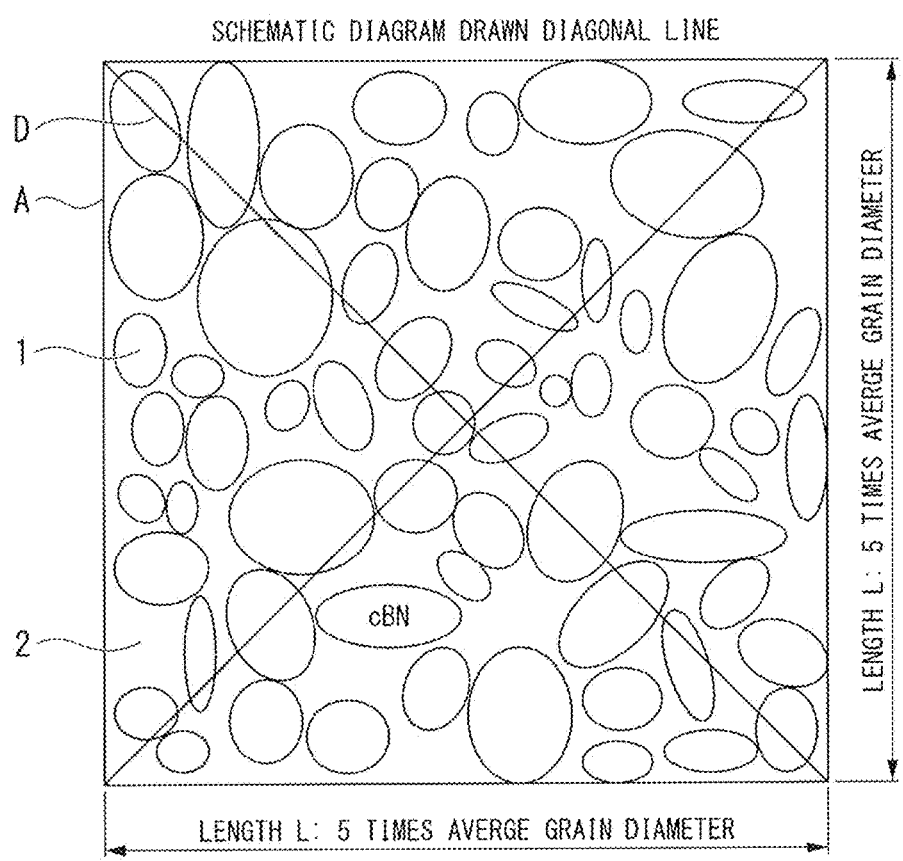
FIG. 13 is a schematic diagram showing a measuring method of a ratio (q/Q) of the number of the cBN particles in which the binder phase with a width of 1 nm to 30 nm is present between the cBN particles, and a measuring method of a ratio (n/N) of the number of the particles having a ratio of an oxygen content to an Al content in the binder phase of 0.1 or less in the invention cBN sintered material.

First, as shown in the schematic diagram of FIG. 13, a square region where the length L of one side is 5 times the average particle diameter of the cBN particles is defined as one measurement field of view range A. For example, in a case where the average particle diameter of the cBN particles is 1 μm, a square region of 5 μm×5 μm is defined as one measurement field of view range.

Subsequently, a diagonal line D is drawn from the vertex of a measurement area A forming a square, and the particle number $Q_1$ of the cBN particle 1 over the diagonal line D is counted.

Subsequently, for each individual cBN particle 1 present on the diagonal line D, whether the binder phase 2 with a width of 1 nm to 30 nm between the adjacent cBN particles 1 is present or not is identified by the above-described method. The particle number $q_1$ of the cBN particle 1 identified as the presence of the binder phase 2 with the width of 1 nm to 30 nm between the adjacent cBN particles 1 is counted, and the value of $q_1/Q_1$ is calculated.

Subsequently, similar measurements are performed on at least 5 fields of view, and the values of $q_n/Q_n$ in the respective fields of view are calculated. Then, the average values of these are obtained to be the values of q/Q.

By the above method, the cBN particles having the binder phase with the width of 1 nm to 30 nm between the adjacent cBN particles can be identified and the ratio (q/Q) of such cBN particles can be obtained. In the present embodiment, it is desirable that the q/Q value is 0.4 or more. The upper limit of the value of q/Q is preferably 1, and the value of q/Q is more preferably 0.6 or more and 1 or less.

<Presence or Absence of Region where O/Al is 0.1 or Less in Binder Phase with Width of 1 nm to 30 nm Present Between Adjacent cBN Particles>

It is desirable that the presence of the cubic boron nitride particles having the binder phase with the width of 1 nm to 30 nm and with a value of O/Al of 0.1 or less between the adjacent cBN particle are observed in fields of view of 60% or more of the total number of observation fields of view. Specifically, for the cross section of the cBN sintered material, 5 or more fields of view are observed, with a field of view with 5 times square of the average particle diameter of the cBN particles as an observation field of view. In each field of view, the presence or absence of the region which is the binder phase with the width of 1 nm to 30 nm between the adjacent cBN particles identified as described above and in which the value of O/Al in the binder phase measured as described above is 0.1 or less, is observed. It is preferable that the number of fields of view in which at least one binder phase is observed is 60% or more of the total number of observation fields of view. It is more preferable that it is observed in the fields of view of 80% or more of the total number of observation fields of view, and further preferable that such region is observed in the entire observation fields of view (observed at 100% of the total number of observation fields of view).

If the region which is the binder phase with the width of 1 nm to 30 nm present between the adjacent cBN particles and in which the value of O/Al in the binder phase is 0.1 or less is increased, many networks in which the adjacent cBN particles are sufficiently adhered with a strong binder phase can be formed and thus the sintered material is excellent in hardness. Furthermore, the lower limit of O/Al is 0.

<Among cBN Particles Having Binder Phase with Width of 1 nm to 30 nm Between Adjacent cBN Particles, Number and Ratio of cBN Particles in which O/Al in Binder Phase is 0.1 or Less>

In the schematic diagram of FIG. 13, according to the method described above, the cBN particles having the binder phase with the width of 1 nm to 30 nm between the adjacent cBN particles are identified. Thereafter, in the binder phase with the width of 1 nm to 30 nm present between the adjacent cBN particles, the number and ratio of the cubic boron nitride particles having O/Al of 0.1 or less are obtained. In other words, among the cBN particles having the binder phase with a width of 1 nm to 30 nm between the adjacent cBN particles, the number (n) of the cBN particles having O/Al of 0.1 or less in the binder phase, and the ratio (n/N) of the cBN particles to the number (N) of the cBN particles having the binder phase with the width of 1 nm to 30 nm between the adjacent cBN particles are obtained. Measurement of the number and calculation of the ratio can be performed as follows.

For example, among the cBN particles 1 over the diagonal line D drawn from the vertex of one square measurement field of view region A in which the length L of one side is five times the average particle diameter of the cBN particle 1, the cBN particles 1 having the binder phase 2 with the width of 1 nm to 30 nm between the adjacent cBN particles 1 are identified and the number $N_1$ of these is counted.

Subsequently, among the cBN particles 1 having the binder phase 2 with the width of 1 nm to 30 nm between the adjacent cBN particles 1, the number $n_1$ of the cBN particles 1 having O/Al in the binder phase 2 of 0.1 or less in terms of area ratio is counted, and the value of $n_1/N_1$ is calculated.

Subsequently, similar measurements are performed on at least 5 fields of view, and the values of $n_n/N_n$ in respective fields of view are calculated. Then, the average value of these is obtained to be the value of n/N.

According to the above method, in the binder phase with the width of 1 nm to 30 nm present between the adjacent cBN particles, the number (n) and the presence ratio (n/N) of the cBN particles with O/Al of 0.1 or less can be obtained. In the present embodiment, it is desirable that the above value of n/N is 0.5 or more. That is, it is desirable that an average ratio of the number (n) of the cBN particles having O/Al of 0.1 or less in the binder phase with the width of 1 nm to 30 nm between the adjacent cBN particles with respect to the number (N) of the cBN particles having the binder phase with the width of 1 nm to 30 nm between the adjacent cBN particles, is 0.5 or more.

In a case where the average region number ratio (n/N) is 0.5 or more, a strong binder phase can be formed between the cBN particles and thus the sintered material exhibits a high hardness. The value of n/N is preferably 0.6 or more, and more preferably 0.8 or more and 1 or less.

The cBN sintered material of the present embodiment is made of the cBN particles and the binder phase as described above. For the binder phase, the configuration of the binder phase formed in the sintered material other than the binder phase with the width of 1 nm to 30 nm present between the adjacent cBN particles is not particularly limited, but it is preferable that the binder phase formed in this region is made of one or more selected from the group consisting of nitride, carbide, carbonitride, and boride of Ti, nitride, boride, and oxide of Al, and a solid solution of two or more thereof, and inevitable impurities.

The cBN sintered material according to the present embodiment described above has a high content ratio of the cBN particles and exhibits hardness equal to or higher than the hardness according to the cBN content. Specifically, the Vickers hardness H of the cBN sintered material satisfies the following formula.

H>−0.42 $C^2$+81.5 C (C represents the amount (vol %) of the cBN particles)

Hereinafter, the cBN sintered material of the present embodiment will be described based on an example.

EXAMPLE

Preparation of cBN Particle Powder with High Surface Cleanliness:

Using the cBN particles having a median diameter (D50) shown in Table 1 as a base material, the cBN particles were coated with AlN films having an average film thickness shown in Table 1 by an atomic layer deposition (ALD) method. More specifically, the cBN particles with the median diameter (D50) shown in Table 1 were charged in a furnace, the inside of the furnace was heated to 350° C. Using a film forming gas containing an $Al(CH_3)_3$ gas as an Al precursor and $NH_3$ gas as a reaction gas, with the following (1) to (4) as one cycle, this cycle was repeated until the AlN film reached the target film thickness.

(1) Ar+$Al(CH_3)_3$ gas inflow step,
(2) Ar gas purge step,
(3) Ar+$NH_3$ gas inflow step,
(4) Ar gas purge step.

As a result, an AlN film with a predetermined film thickness was formed on the surface of the cBN particles.

When the cBN particle powder coated with the AlN film obtained by the above procedure was observed using a scanning electron microscope (SEM), it was confirmed that the surface of the cBN particle was coated with the AlN film with the average film thickness shown in Table 1.

Subsequently, the cBN particles having the AlN film formed on the surface thereof were subjected to heat treatment at a temperature of approximately 1000° C. under vacuum for 30 minutes to diffuse impurity elements such as oxygen on the cBN surface into the AlN film. Then, the AlN film in which the impurity element was trapped was peeled off from the cBN surface by a ball mill mixing using a container and balls made of tungsten carbide.

The cBN particle powder with a predetermined median diameter was prepared by the above procedure, and TiN powder, TiC powder, Al powder, $TiAl_3$ powder, and WC powder having an average particle diameter within the range of 0.3 to 0.9 μm were prepared as raw material powder for forming the binder phase. These were blended so that the content ratio of the cBN particle powder was 70 to 95 vol % when the total amount of the several raw material powders selected from the above raw material powders and the cBN particle powder was 100 vol %, subjected to wet blending, and dried. Thereafter, the mixture was press-molded into a size of 50 mm in diameter and 1.5 mm in thickness at a molding pressure of 1 MPa using a hydraulic press to obtain a molded material. Then, the molded material was subjected to heat treatment by maintaining the molded material at a predetermined temperature within the range of 1000° C. to 1300° C. for 30 to 60 minutes in a vacuum atmosphere at a pressure of 1 Pa, charged in a conventional ultra-high pressure sintering apparatus, and sintered at a ultra-high pressure and a high temperature under the conventional conditions of pressure: 5 GPa, temperature: 1600° C., and maintaining time: 30 minutes. Thereby, the invention cBN sintered materials 1 to 17 shown in Table 2 were prepared.

The binder phase structure other than the cBN of the sintered material shown in Table 2 was confirmed by X-ray diffraction (XRD) of the cBN sintered material.

The above preparing process is preferably performed to prevent oxidation of the raw material powder in the process up to the ultra-high pressure sintering, and specifically, it is preferable to handle the raw material powder and the molded material in a non-oxidizing protective atmosphere.

TABLE 1

| Type | | Diameter of cBN raw material particle (μm) Median diameter (D50) | AlN film thickness (nm) Average value obtained from SEM image |
|---|---|---|---|
| cBN particle | A | 0.5 | 6 |
| | B | 0.9 | 4 |
| | C | 1.7 | 7 |
| | D | 4.1 | 5 |
| | E | 5.6 | 7 |
| | F | 7.7 | 6 |
| | G | 9.6 | 8 |

TABLE 2

| | | | | Average particle diameter of cBN particle (μm) | Average cBN content (vol %) | Average Vickers hardness HV [5 kg] | Presence or absence of binder phase with width of 1 to 30 nm between adjacent cBN particles | Presence or absence of Al, B, and N elements in binder phase with width of 1 to 30 nm present at interface between adjacent cBN particles | | |
|---|---|---|---|---|---|---|---|---|---|---|
| Type | | cBN particle type | Binder phase structure other than cBN (XRD) | | | | | Al | B | N |
| Invention cBN sintered material | 1 | A | TiN, $TiB_2$, AlN, $Al_2O_3$, WC | 0.5 | 75.2 | 3860 | Presence | Presence | Presence | Presence |
| | 2 | B | TiN, $TiB_2$, AlN, $Al_2O_3$ | 1.1 | 70.0 | 3720 | Presence | Presence | Presence | Presence |
| | 3 | B | TiC, $TiB_2$, AlN, $Al_2O_3$, WC | 1.3 | 73.2 | 3880 | Presence | Presence | Presence | Presence |
| | 4 | B | TiN, $TiB_2$, AlN, $Al_2O_3$ | 0.9 | 75.9 | 3970 | Presence | Presence | Presence | Presence |
| | 5 | B | TiN, $TiB_2$, AlN, $Al_2O_3$ | 1.2 | 77.9 | 4010 | Presence | Presence | Presence | Presence |
| | 6 | B | TiN, $TiB_2$, AlN, $Al_2O_3$ | 1.0 | 80.0 | 4050 | Presence | Presence | Presence | Presence |
| | 7 | C | TiN, $TiB_2$, AlN, $Al_2O_3$, WC | 2.1 | 74.1 | 3890 | Presence | Presence | Presence | Presence |
| | 8 | C | TiN, $TiB_2$, AlN, $Al_2O_3$ | 1.9 | 95.0 | 4240 | Presence | Presence | Presence | Presence |

TABLE 2-continued

| | | | | cBN sintered material | | | | | | |
|---|---|---|---|---|---|---|---|---|---|---|
| | | | | Average particle diameter of cBN particle | Average cBN content | Average Vickers hardness HV | Presence or absence of binder phase with width of 1 to 30 nm between adjacent cBN | Presence or absence of Al, B, and N elements in binder phase with width of 1 to 30 nm present at interface between adjacent cBN particles | | |
| Type | | cBN particle type | Binder phase structure other than cBN (XRD) | (μm) | (vol %) | [5 kg] | particles | Al | B | N |
| | 9 | D | TiC, TiB$_2$, AlN, Al$_2$O$_3$, WC | 4.4 | 75.2 | 3840 | Presence | Presence | Presence | Presence |
| | 10 | E | TiN, TiB$_2$, AlN, Al$_2$O$_3$, WC | 6.2 | 74.8 | 3870 | Presence | Presence | Presence | Presence |
| | 11 | F | TiC, TiB$_2$, AlN, Al$_2$O$_3$ | 8.0 | 73.0 | 3820 | Presence | Presence | Presence | Presence |
| | 12 | G | TiN, TiB$_2$, AlN, Al$_2$O$_3$, WC | 10.4 | 72.9 | 3790 | Presence | Presence | Presence | Presence |
| | 13 | A | TiCN, TiB$_2$, AlN, Al$_2$O$_3$ | 0.5 | 84.3 | 4120 | Presence | Presence | Presence | Presence |
| | 14 | C | TiN, TiB$_2$, AlN, Al$_2$O$_3$ | 2.2 | 88.7 | 4180 | Presence | Presence | Presence | Presence |
| | 15 | F | TiN, TiB$_2$, AlN, Al$_2$O$_3$ | 8.0 | 89.8 | 4140 | Presence | Presence | Presence | Presence |
| | 16 | B | TiN, TiB$_2$, AlN, Al$_2$O$_3$, WC | 0.8 | 87.5 | 4190 | Presence | Presence | Presence | Presence |
| | 17 | G | TiCN, TiB$_2$, AlN, Al$_2$O$_3$ | 9.9 | 76.1 | 3840 | Presence | Presence | Presence | Presence |

TABLE 3

| | | cBN sintered material | | | |
|---|---|---|---|---|---|
| Type | | cBN particle type | Average value of 5 O/Al (area ratio) | Number of observation fields of view | q/Q | n/N |
| Invention cBN sintered material | 1 | A | 0.02 | 10 | 0.7 | 0.8 |
| | 2 | B | 0.06 | 6 | 0.4 | 0.5 |
| | 3 | B | 0.03 | 8 | 0.6 | 0.8 |
| | 4 | B | 0.05 | 10 | 0.9 | 1.0 |
| | 5 | B | 0.07 | 10 | 0.7 | 0.8 |
| | 6 | B | 0.04 | 10 | 0.9 | 1.0 |
| | 7 | C | 0.04 | 9 | 0.7 | 0.8 |
| | 8 | C | 0.04 | 10 | 0.8 | 0.9 |
| | 9 | D | 0.08 | 10 | 0.8 | 0.8 |
| | 10 | E | 0.03 | 10 | 0.8 | 0.9 |
| | 11 | F | 0.10 | 8 | 0.5 | 0.6 |
| | 12 | G | 0.10 | 6 | 0.4 | 0.5 |
| | 13 | A | 0.07 | 10 | 0.8 | 0.8 |
| | 14 | C | 0.03 | 10 | 0.8 | 0.9 |
| | 15 | F | 0.09 | 9 | 0.7 | 0.9 |
| | 16 | B | 0.04 | 10 | 0.9 | 0.9 |
| | 17 | G | 0.09 | 8 | 0.7 | 0.8 |

For comparison, the cBN particle powders a, b, e to i were prepared as raw material powders with the median diameter (D50) shown in Table 4 on which an AlN film coating by an atomic layer deposition (ALD) method was not performed (naturally, heat treatment of AlN film under vacuum and separation processing of AlN film from cBN surface were not performed). In addition, in the same manner as the invention cBN sintered materials 1 to 17, the cBN particle powders c and d with the median diameter (D50) shown in Table 4 were prepared by coating the AlN film with the average film thickness shown in Table 4, performing the heat treatment at a temperature of approximately 1000° C. under vacuum for 30 minutes, and then peeling the AlN film from the cBN surface through ball mill mixing. TiN powder, TiC powder, Al powder, TiAl$_3$ powder and WC powder with an average particle diameter in the range of 0.3 to 0.9 μm were prepared as raw material powders for forming the binder phase, the powders were blended so that the content ratio of the cBN particle powders was 55 to 98.2 vol % when the total amount of several raw material powders selected from the above raw material powders and the cBN particle powders was 100 vol %, and comparative cBN sintered materials 1 to 10 shown in Table 5 were produced in the same manner as the invention cBN sintered materials 1 to 17.

TABLE 4

| Type | | Diameter of cBN raw material particle (μm) Median diameter (D50) | AlN film thickness (nm) Average value obtained from SEM image |
|---|---|---|---|
| cBN particle | a | 0.4 | |
| | b | 0.9 | |
| | c | 0.9 | 4 |
| | d | 0.9 | 7 |
| | e | 1.7 | |
| | f | 4.1 | |
| | g | 5.6 | |
| | h | 7.7 | |
| | i | 9.6 | |

TABLE 5

| | | | | cBN sintered material | | | | | | |
|---|---|---|---|---|---|---|---|---|---|---|
| | | | | Average particle diameter of cBN particle | Average cBN content | Average Vickers hardness HV | Presence or absence of binder phase with width of 1 to 30 nm between adjacent cBN | Presence or absence of Al, B, and N elements in binder phase with width of 1 to 30 nm present at interface between adjacent cBN particles | | |
| Type | | cBN particle type | Binder phase structure other than cBN (XRD) | (μm) | (vol %) | [5 kg] | particles | Al | B | N |
| Comparative cBN | 1 | a | TiN, TiB$_2$, AlN, Al$_2$O$_3$, WC | 0.5 | 73.8 | 3390 | Presence | Absence | Absence | Absence |
| | 2 | b | TiN, TiB$_2$, AlN, Al$_2$O$_3$ | 1.1 | 76.3 | 3520 | Presence | Absence | Absence | Absence |

TABLE 5-continued

| | | | | cBN sintered material | | | | | | |
|---|---|---|---|---|---|---|---|---|---|---|
| Type | | cBN particle type | Binder phase structure other than cBN (XRD) | Average particle diameter of cBN particle (μm) | Average cBN content (vol %) | Average Vickers hardness HV [5 kg] | Presence or absence of binder phase with width of 1 to 30 nm between adjacent cBN particles | Presence or absence of Al, B, and N elements in binder phase with width of 1 to 30 nm present at interface between adjacent cBN particles | | |
| | | | | | | | | Al | B | N |
| sintered material | 3 | c | TiN, TiB$_2$, AlN, Al$_2$O$_3$ | 0.9 | 55.0 | 3190 | Presence | Presence | Presence | Presence |
| | 4 | d | TiN, TiB$_2$, AlN, Al$_2$O$_3$, WC | 2.2 | 98.2 | 3690 | Presence | Presence | Presence | Presence |
| | 5 | e | TiN, TiB$_2$, AlN, Al$_2$O$_3$, WC | 2.1 | 74.7 | 3560 | Presence | Absence | Absence | Absence |
| | 6 | e | TiN, TiB$_2$, AlN, Al$_2$O$_3$ | 1.9 | 95.0 | 3710 | Presence | Absence | Absence | Absence |
| | 7 | f | TiN, TiB$_2$, AlN, Al$_2$O$_3$ | 4.3 | 75.6 | 3480 | Presence | Absence | Absence | Absence |
| | 8 | g | TiN, TiB$_2$, AlN, Al$_2$O$_3$, WC | 6.2 | 74.3 | 3390 | Presence | Absence | Absence | Absence |
| | 9 | h | TiC, TiB$_2$, AlN, Al$_2$O$_3$ | 8.0 | 73.4 | 3410 | Presence | Absence | Absence | Absence |
| | 10 | i | TiN, TiB$_2$, AlN, Al$_2$O$_3$ | 10.4 | 73.2 | 3460 | Presence | Absence | Absence | Absence |

TABLE 6

| | | cBN sintered material | | | |
|---|---|---|---|---|---|
| Type | cBN particle type | Average value of 5 O/Al (area ratio) | Number of observation fields of view | q/Q | n/N |
| Comparative cBN sintered material | 1 a | — | — | 0.5 | — |
| | 2 b | — | — | 0.7 | — |
| | 3 c | 0.10 | 1 | 0.1 | 0.5 |
| | 4 d | 0.09 | 9 | 0.9 | 0.9 |
| | 5 e | — | — | 0.4 | — |
| | 6 e | — | — | 0.9 | — |
| | 7 f | — | — | 0.6 | — |
| | 8 g | — | — | 0.5 | — |
| | 9 h | — | — | 0.6 | — |
| | 10 i | — | — | 0.4 | — |

For the invention cBN sintered materials 1 to 17 and the comparative cBN sintered materials 1 to 10 prepared as above, the average particle diameter (μm) of the cBN particles and the content ratio (vol %) of the cBN particles were calculated.

The average particle diameter of the cBN particles was obtained by the method described above. That is, the structure of the cross-section of the cBN sintered material was observed by a scanning electron microscope (SEM) to obtain a secondary electron image. A portion of the cBN particles in the obtained image was extracted by image processing, and the maximum length of each particle was obtained from image analysis. The maximum length was set as the diameter of each particle and the volume was calculated assuming that each particle was an ideal sphere.

The median diameter in the distribution curve of the cumulative volume % and the diameter was obtained from one image, and the average value of the median diameters obtained from at least three images was set as the average particle diameter (μm) of the cBN. The observation region used for the image processing was 15 μm×15 μm. The calculated average particle diameter is shown in Tables 2 and 5.

In addition, component analysis and measurement of O/Al in the binder phase with the width of 1 nm to 30 nm present between the adjacent cBN particles were performed as described above.

That is, after the cross section of the cBN sintered material is polished, the interface where the cBN particles were adjacent to each other was observed using the TEM, and mapping images of B, N, Al, and O elements (refer to FIGS. 2 to 4, 11 and 12) were obtained at the observation point.

Subsequently, from the mapping image of B and N, it was confirmed that it was the observation site between the cBN particles.

Subsequently, the mapping image of Al, the mapping image of B, and the mapping image of N were superimposed, and from the overlapping portion of Al, B, and N, the interface boundary line between the cBN particles was obtained as described above. In addition, based on the obtained interface boundary line, it was confirmed that the width of the binder phase between the cBN particles was 30 nm or less by the above method.

Subsequently, using the image obtained by the binarization processing of the mapping images of Al and O, the amounts (area ratio) of Al and O was obtained in the region with the width of 30 nm centered on the interface boundary line confirmed above.

From the amounts (area ratio) of Al and O obtained above, O/Al in the binder phase of the region was calculated.

According to the above procedure, the values of O/Al were measured in at least five regions, and the average value thereof was obtained as the value of O/Al in the binder phase with the width of 1 nm to 30 nm between the adjacent cBN particles. The results are shown in Tables 3 and 6.

Identification of the cBN particles having the binder phase with the width of 1 nm to 30 nm between the adjacent cBN particles and measurement of the presence ratio (q/Q) of such cBN particles were performed as described above. That is, as shown in the schematic diagram of FIG. 13, a region of 5 times square of the average particle diameter of the cBN particles was defined as one measurement field of view range, a diagonal line is drawn from the vertex of the square measurement region, and the particle number Q$_1$ of the cBN particles over the diagonal line was counted. Then, among the cBN particles on the diagonal line, the cBN particles having the binder phase with the width of 1 nm to 30 nm between the adjacent cBN particles were identified, and the particle number q$_1$ of the identified cBN particles was counted. The value of q$_1$/Q$_1$ was calculated. Similar measurements were performed for the total of 10 fields of view, and the values of q$_n$/Q$_n$ in each field of view were calculated. Then, the average of these values was obtained as the value of q/Q. The obtained values are shown in Tables 3 and 6 as the average particle number ratios (q/Q) of the cBN particles having the binder phase with a width of 1 nm to 30 nm between the adjacent cBN particles.

In addition, the number of observation fields of view in which the region was observed was obtained, where the region had the binder phase with the width of 1 nm to 30 nm between the adjacent cBN particles and had the value of O/Al in the binder phase of 0.1 or less. The results are shown in Tables 3 and 6 as the number of observation fields of view. The number of observation fields of view in the Tables means that in a total of 10 observation fields of view, the number of fields of view in which the binder phase with the width of 1 nm to 30 nm is present between the adjacent cBN particles and the region where the value of O/Al in the binder phase in the region with the width of 30 nm centered on the interface boundary line obtained from the binder phase is 0.1 or less is observed. "-" in the table means that O/Al could not be calculated, since the binder phase with the width of 1 nm to 30 nm was present between the adjacent cBN particles, but overlapping portion of Al, B, and N elements in the element mappings was absent (binder phase containing at least Al, B, and N was absent) and thus the interface boundary line could not be defined.

In addition, as shown in the schematic diagram of FIG. 13, a region of 5 times square of the average particle diameter of the cBN particles was defined as one measurement field of view range, and the diagonal line was drawn from the vertex of the square measurement region. Among the cBN particles over the diagonal line, the cBN particles having the binder phase with the width of 1 nm to 30 nm between the adjacent cBN particles were identified, and number $N_1$ thereof was counted. Then, among the cBN particles having the binder phase with the width of 1 nm to 30 nm between adjacent cBN particles, the number $n_1$ of the cBN particles having O/Al of 0.1 or less in terms of area ratio in the binder phase was counted. The value of $n_1/N_1$ was calculated. Similar measurements were performed for a total of 10 fields of view, the value of $n_n/N_n$ was calculated in each field of view, and then the average value of the obtained values was obtained as the value of n/N. The results are shown in Tables 3 and 6. n/N in the table represents the average ratio (n/N) of the number of the cBN particles having the binder phase with the width of 1 nm to 30 nm between the adjacent cBN particles and O/Al of 0.1 or less in the region with the width of 30 nm centered on the interface boundary line, with respect to the number of the cBN particles in which the binder phase with the width of 1 nm to 30 nm is present on the interface with the adjacent cBN particles. "-" in the table means that O/Al could not be calculated, since the binder phase with the width of 1 nm to 30 nm was present between the adjacent cBN particles, but overlapping portion of Al, B, and N elements in the element mappings was absent and the interface boundary line could not be defined.

In addition, for the polished surfaces of the invention cBN sintered materials 1 to 17 and the comparative cBN sintered materials 1 to 10, Vickers hardness (HV) was measured at measurement points of 10 points with a load of 5 kg, and the obtained values were averaged, thereby measuring the hardness of the sintered material. For the value of hardness, the number at the first digit was rounded off.

These values are shown in Tables 2 and 5.

Figure 14:
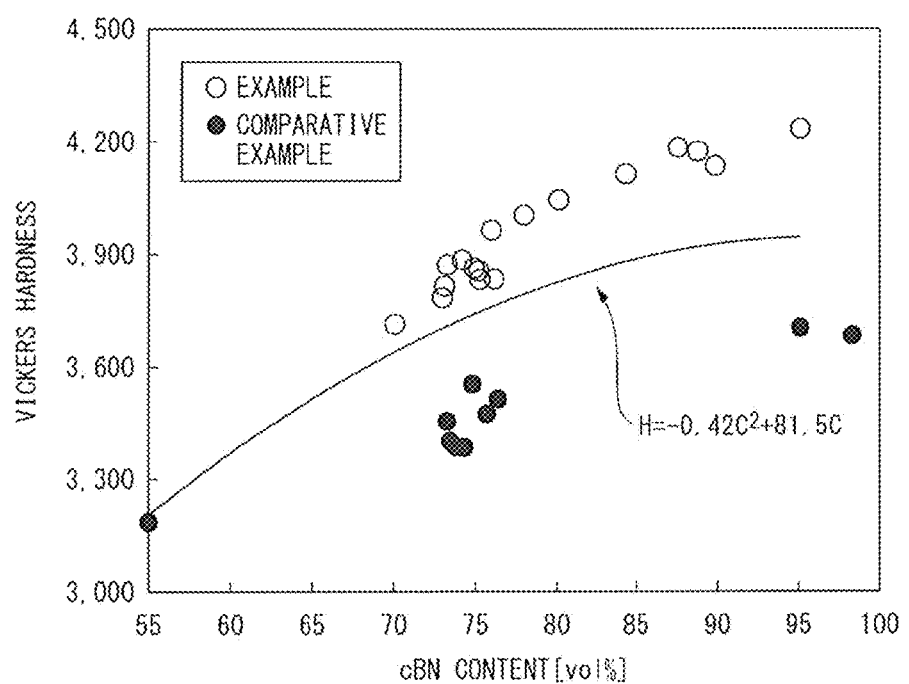
FIG. 14 is a graph showing a relationship between a cBN content and a Vickers hardness HV of the invention cBN sintered materials and comparative cBN sintered materials, and the curve in the graph represents $H=-0.42\ C^2+81.5\ C$ (herein, H represents a Vickers hardness, and C represents a cBN content by vol %).

In addition, FIG. 14 shows a graph plotting the relationship between cBN content C (vol %) and Vickers hardness H (HV) obtained from Tables 2 and 4.

From the results shown in Tables 3 and 6, in the invention cBN sintered materials 1 to 17, by pretreating the cBN particles, the binder phase between the cBN particles had an average O/Al of 0.10 or less, the amount of oxides was small, and a strong binder phase was formed. Furthermore, the number of fields of view in which the binder phase with the width of 1 nm to 30 nm was present between the adjacent cBN particles and the region where the value of O/Al in such binder phase was 0.1 or less was observed, was 60% or more of the total number of observation fields of view. Therefore, the amount of the unsintered portions where the cBN particles contact each other and cannot sufficiently react with the binder phase were small. Therefore, in the range of cBN content ratio of 70 to 95 vol %, the Vickers hardness (HV) was 3720 or more which was high hardness.

On the other hand, in the comparative cBN sintered material 3, since the treatment to increase the surface cleanliness was performed on the cBN particles, the average O/Al was 0.10 or less and the amount of oxides was small. However, the cBN content was less than the range specified in the present embodiment, and therefore the Vickers hardness (HV) was 3190 which was low hardness.

In addition, similarly to the comparative cBN sintered material 3, the comparative cBN sintered material 4 was subjected to the treatment to increase the surface cleanliness, so that the average O/Al was 0.10 or less and the amount of oxides was small. In addition, although the cBN content was higher than the range specified in the present embodiment, the Vickers hardness (HV) was at 3690. Incidentally, the invention cBN sintered materials 6 and 8 had the cBN content smaller than that of the comparative cBN sintered material 4, but they showed much high hardness HV=4050 and 4210 compared to the comparative cBN sintered material 4.

In addition, the comparative cBN sintered material 6 had a high cBN content ratio and the Vickers hardness (HV) of 3710, and the hardness was lower than the Vickers hardness (HV) of 4210 of the invention cBN sintered material 8 having the same cBN content ratio.

In addition, in each of the other comparative cBN sintered materials 1, 2, 5, and 7 to 10, the O/Al was 0.73 or more on average and the Vickers hardness (HV) was 3560 or less, which was low hardness.

In addition, for the invention cBN sintered materials 1 to 17 and the comparative cBN sintered materials 1 to 10, as can be known from FIG. 14 in which values of cBN content and Vickers hardness are plotted, the invention cBN sintered materials 1 to 17 were positioned above the curve represented by $H=-0.42 C^2+81.5 C$ (herein, H represents Vickers hardness and C represents cBN content by vol %.). On the other hand, all of the comparative cBN sintered materials 1 to 10 were positioned under the curve. From these facts, in a case where the hardness is compared with the cBN sintered materials having the same cBN content, it is obvious that the hardness of the invention cBN sintered material is much higher than that of the comparative cBN sintered material. The curve in FIG. 14 represents the relationship between the cBN particle content and Vickers hardness of the cBN sintered material empirically obtained.

INDUSTRIAL APPLICABILITY

As described above, the cBN sintered material of the present invention has high hardness and high binding strength between the cBN particle and the binder phase. Therefore, for example, in a case of being used as the cutting tool made of cBN in which a high load acts on the cutting edge portion, the cBN sintered material has excellent resistance to abnormal damage such as fracturing resistance and exhibits excellent wear resistance over a long period of use, so that the cBN sintered material is expected to be applied as a fracturing resistance material such as a tool material.

The invention claimed is:

1. A cubic boron nitride-based sintered material comprising:
    cubic boron nitride particles of 70 to 95 vol %,
    wherein in a structure of a cross-section of the sintered material, a binder phase with a width of 1 nm to 30 nm is present between the adjacent cubic boron nitride particles, the binder phase being made of a compound containing at least Al, B, and N and having a ratio of an oxygen content to an Al content of 0.1 or less in terms of atomic ratio.

2. A cubic boron nitride-based sintered material comprising;
    cubic boron nitride particles of 70 to 95 vol %,
    wherein in a structure of a cross-section of the sintered material, there is a region where an interval between the adjacent cubic boron nitride particles is 30 nm or less, where a binder phase is made of a nitride containing at least one of Al and B, or both Al and B, and an Al oxide, and where a ratio of an oxygen content to an Al content in the binder phase is 0.1 or less in terms of atomic ratio.

3. The cubic boron nitride-based sintered material according to claim 1,
    wherein the average particle diameter of the cubic boron nitride particles is 0.5 to 8.0 μm,
    in at least five fields of view of the structure of the cross-section of the cubic boron nitride-based sintered material with a field of view of 5 times×5 times the average particle diameter of the cubic boron nitride particles as one field of view, the cubic boron nitride particles having a binder phase with a width of 1 nm to 30 nm between the adjacent cubic boron nitride particle are observed in fields of view of 60% or more of the total number of the fields of view, the binder phase having a ratio of an oxygen content to an Al content of 0.1 or less.

4. The cubic boron nitride-based sintered material according to claim 1,
    wherein in the structure of the cross-section of the cubic boron nitride-based sintered material:
    an average particle number ratio of the number of the cubic boron nitride particles having the binder phase with a width of 1 nm to 30 nm between the adjacent cubic boron nitride particle with respect to the total number of the cubic boron nitride particles in the observed cross-section is 0.4 or more; and
    among the cubic boron nitride particles having the binder phase with a width of 1 nm to 30 nm between the adjacent cubic boron nitride particle, an average ratio of the number of the cubic boron nitride particles having the binder phase with a ratio of an oxygen content to an Al content of 0.1 or less with respect to the number of the cubic boron nitride particles having the binder phase with a width of 1 nm to 30 nm between the adjacent cubic boron nitride particle is 0.5 or more.

5. The cubic boron nitride-based sintered material according to claim 1,
    wherein the binder phases which are present between the adjacent cubic boron nitride particles and have a width of 1 nm to 30 nm are dotted between the adjacent cubic boron nitride particles.

6. A cutting tool made of cubic boron nitride-based sintered material comprising:
    a cutting edge portion made of the cubic boron nitride-based sintered material according to claim 1.

7. The cubic boron nitride-based sintered material according to claim 2,
    wherein the average particle diameter of the cubic boron nitride particles is 0.5 to 8.0 μm,
    in at least five fields of view of the structure of the cross-section of the cubic boron nitride-based sintered material with a field of view of 5 times×5 times the average particle diameter of the cubic boron nitride particles as one field of view, the cubic boron nitride particles having a binder phase with a width of 1 nm to 30 nm between the adjacent cubic boron nitride particle are observed in fields of view of 60% or more of the total number of the fields of view, the binder phase having a ratio of an oxygen content to an Al content of 0.1 or less.

8. The cubic boron nitride-based sintered material according to claim 2,
    wherein in the structure of the cross-section of the cubic boron nitride-based sintered material:
    an average particle number ratio of the number of the cubic boron nitride particles having the binder phase with a width of 1 nm to 30 nm between the adjacent cubic boron nitride particle with respect to the total number of the cubic boron nitride particles in the observed cross-section is 0.4 or more; and
    among the cubic boron nitride particles having the binder phase with a width of 1 nm to 30 nm between the adjacent cubic boron nitride particle, an average ratio of the number of the cubic boron nitride particles having the binder phase with a ratio of an oxygen content to an Al content of 0.1 or less with respect to the number of the cubic boron nitride particles having the binder phase with a width of 1 nm to 30 nm between the adjacent cubic boron nitride particle is 0.5 or more.

9. The cubic boron nitride-based sintered material according to claim 7,
    wherein in the structure of the cross-section of the cubic boron nitride-based sintered material:
    an average particle number ratio of the number of the cubic boron nitride particles having the binder phase with a width of 1 nm to 30 nm between the adjacent cubic boron nitride particle with respect to the total number of the cubic boron nitride particles in the observed cross-section is 0.4 or more; and
    among the cubic boron nitride particles having the binder phase with a width of 1 nm to 30 nm between the adjacent cubic boron nitride particle, an average ratio of the number of the cubic boron nitride particles having the binder phase with a ratio of an oxygen content to an Al content of 0.1 or less with respect to the number of the cubic boron nitride particles having the binder phase with a width of 1 nm to 30 nm between the adjacent cubic boron nitride particle is 0.5 or more.

10. The cubic boron nitride-based sintered material according to claim 2,
    wherein the binder phases which are present between the adjacent cubic boron nitride particles and have a width of 1 nm to 30 nm are dotted between the adjacent cubic boron nitride particles.

11. A cutting tool made of cubic boron nitride-based sintered material comprising:
    a cutting edge portion made of the cubic boron nitride-based sintered material according to claim 2.

* * * * *